Oct. 4, 1955  D. D. KALLENBACH  2,719,942
MOTOR CONTROL CIRCUIT
Filed Oct. 21, 1950  2 Sheets-Sheet 1
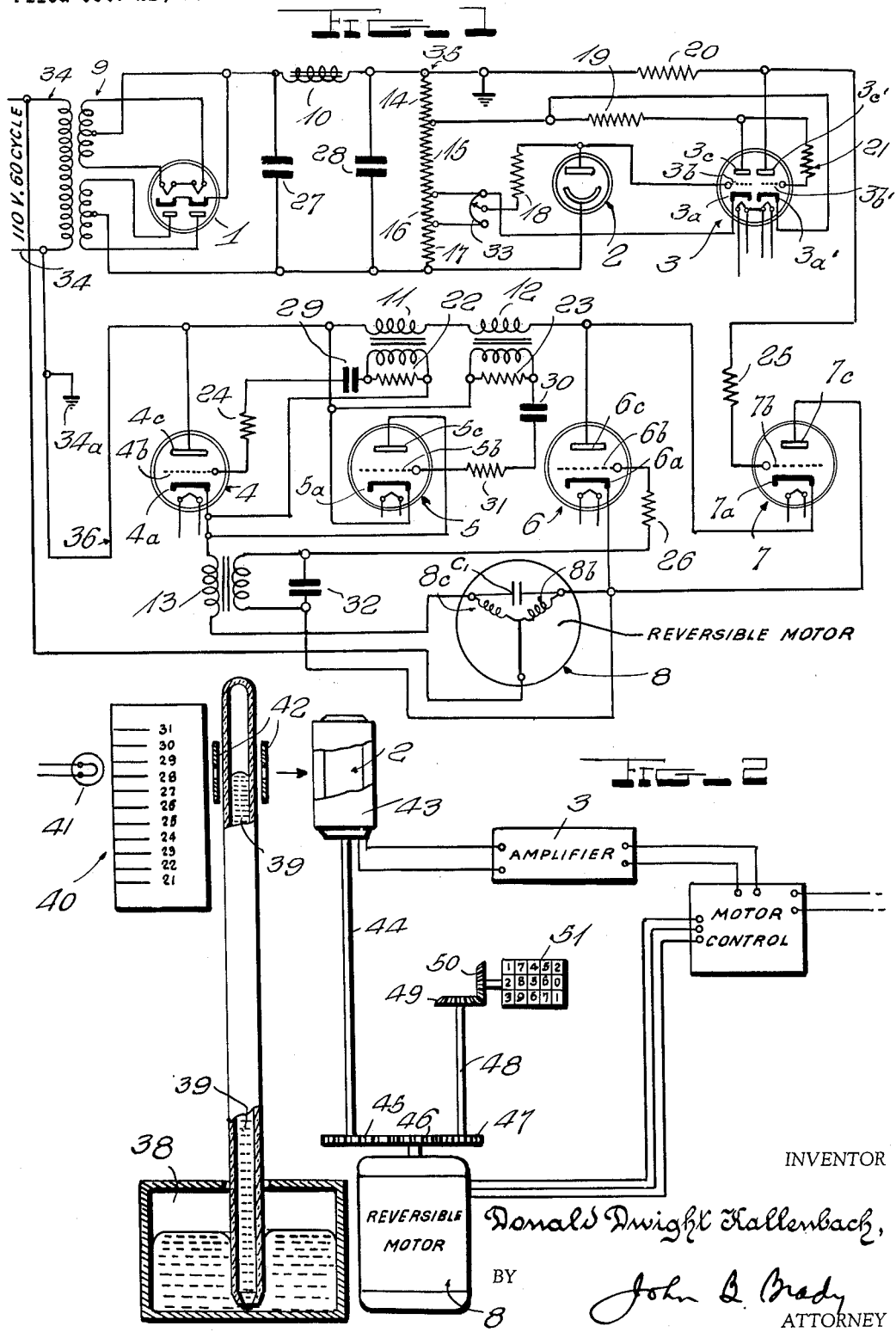
INVENTOR
Donald Dwight Kallenbach,
BY John B. Brady
ATTORNEY Oct. 4, 1955   D. D. KALLENBACH   2,719,942
MOTOR CONTROL CIRCUIT
Filed Oct. 21, 1950   2 Sheets-Sheet 2
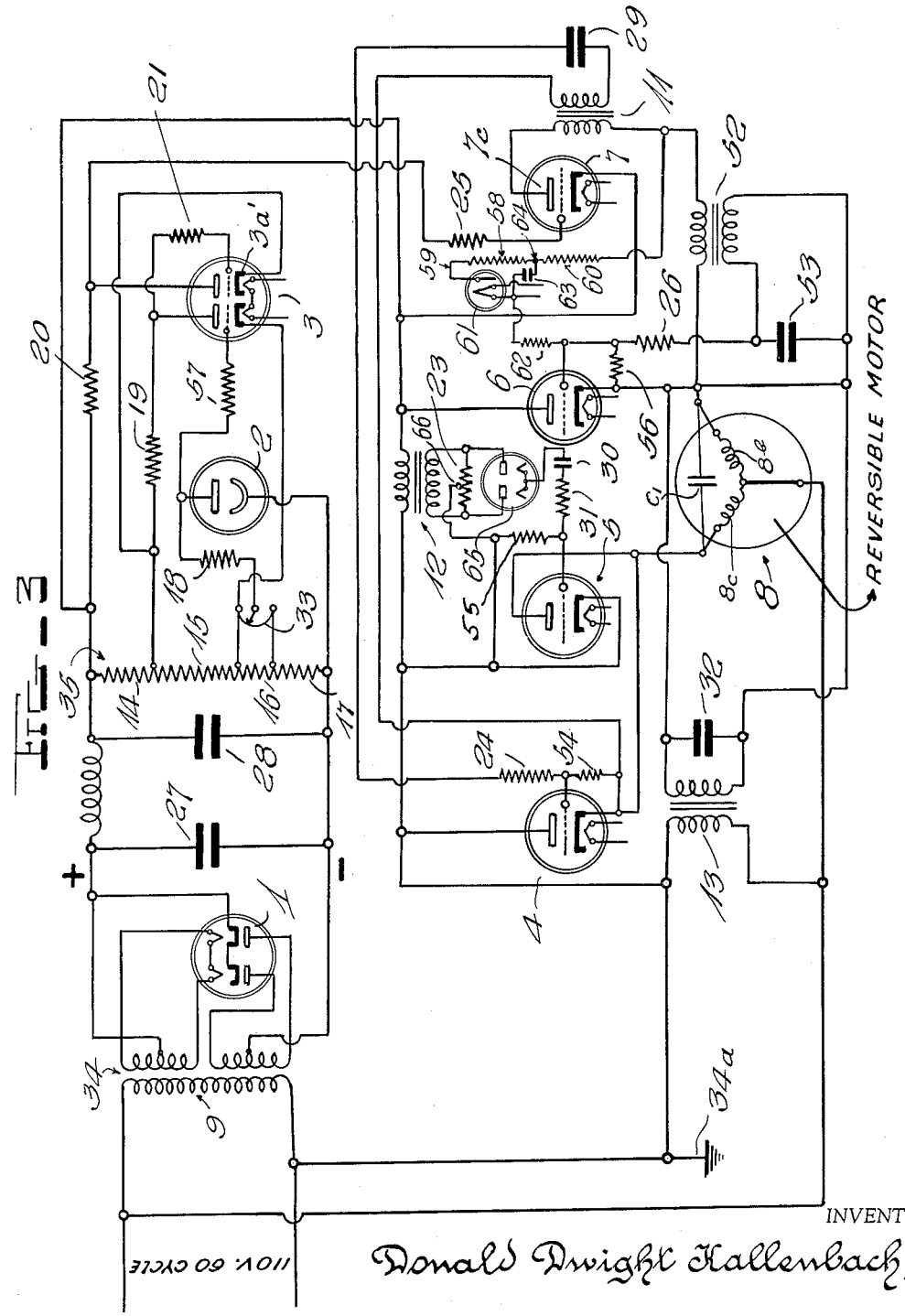
INVENTOR
Donald Dwight Kallenbach,
BY John B. Brady
ATTORNEY

United States Patent Office 2,719,942
Patented Oct. 4, 1955

2,719,942

MOTOR CONTROL CIRCUIT

Donald Dwight Kallenbach, Cheyenne, Wyo., assignor, by mesne assignments, to Ideal-Aerosmith, Inc., a corporation of California Application October 21, 1950, Serial No. 191,409

4 Claims. (Cl. 318—207)

My invention relates broadly to electrical control systems and more particularly to precision control circuits for transmitting and translating measurements electronically at a distance.

This application is a continuation-in-part of my application Serial Number 721,278, filed January 10, 1947, for Electronically Controlled Mechanism for Barometers and the like, now abandoned.

One of the objects of my invention is to provide an electrical circuit arrangement for electronically controlling the operation of rotary drive mechanism in accordance with changes in position of a light beam.

Another object of my invention is to provide a differentially controlled electronic system for governing the direction of rotative motion at a distance in accordance with changes in the position of a light beam without the interposition of contactors.

Another object of my invention is to provide an arrangement of balanced Thyratron tube system for controlling the rotation of an electric motor system according to changes to angular position of a light beam at a remote location.

Still another object of my invention is to provide an arrangement of Thyratron tube control circuit for rotary motors in which pairs of Thyratron power tubes are arranged to control the forward and reverse movement of the rotary motor according to changes in angular position of a light beam in a remote location.

A further object of my invention is to provide a circuit arrangement for a direct reading barometer in which a mechanical odometer is rotatively driven clockwise or counter-clockwise for visually and directly providing a barometric reading in accordance with the position of a light beam directly controlled by the instantaneous atmospheric pressure upon a column of mercury.

Other and further objects of my invention reside in the adaptation of an electronic control to mercury-in-glass barometers as set forth more fully in the specification hereinafter following by reference to the accompanying drawings in which:

Figure 1 is a schematic diagram showing the electrical control system of my invention; Fig. 2 schematically illustrates the application of the electrical control system of my invention to a mercury-in-glass barometer; and Fig. 3 is a circuit diagram of a modified form of the electrical control system of my invention.

Referring to the drawings in detail the electrical control system of my invention is illustrated in one form in Fig. 1 in which reference character 1 designates a full wave rectifier tube having the cathodes and anodes thereof energized from a power transformer 9 connected to the usual source of commercial power supply such as 110 volts 60 cycle alternating current. The electrical control system includes the photo electric tube 2 connected in the control circuit of the double triode tube 3 constituting an amplifier. The double triode tube 3 includes sets of electrodes represented by cathode 3a, control grid 3b and anode 3c and cathode 3a', control grid 3b' and anode 3c'.

The photo electric tube 2 is connected in series with control grid 3b and the portions 17 and 16 of the voltage divider 35 to the cathode 3a. A bias control circuit is associated with photoelectric tube 2 comprising resistor 18 and a movable contactor on potentiometer 33. Bias may thus be varied from the limit provided by the drop across portion 17 of the voltage divider, within limits of the voltage drop across portion 16 of the voltage divider. The movable contactor on potentiometer 33 provides a fine adjustment for the bias potential.

The other branch of the dual triode tube 3 has the circuit thereof completed from cathode 3a' to a tap on voltage divider 35 which includes the portion 15 of the voltage divider. A resistor 19 is connected between the portion 15 of the potentiometer and the anode 3c constituting the plate load for the first stage of the amplifier. A resistor 21 is included in the circuit between control grid 3b' and anode 3c. A resistor 20 is included as part of the plate load for the second stage of amplification extending from anode 3c' to the portion 14 of the voltage divider 35. Thus the dual triode tube 3 with the photoelectric tube 2 associated with one set of electrodes therein functions as a two stage amplifier with the set of electrodes 3a, 3b and 3c operating as one amplifier stage and the set of electrodes 3a', 3b' and 3c' operating as the second set of electrodes. The cathodes 3a and 3a' are raised to electron emitting temperature by heaters which are powered from the transformer 9. Transformer 9 similarly furnishes the plate, control grid and cathode heating potential for all of tubes of the system including the Thyratrons represented at 4, 5, 6 and 7. A filter is provided between full wave rectifier tube 1 and the voltage divider 35 comprising condenser 27, condenser 28 and reactor 10.

The Thyratron tubes 6 and 7 are arranged in coacting relation for controlling the driving of reversible motor represented at 8 in a clockwise direction whereas Thyratrons 4 and 5 are arranged in coacting relation for controlling the operation of motor 8 in a counter-clockwise direction. That is to say, one pair of Thyratron tubes 6 and 7 control the forward driving movement of motor 8 whereas the other set of Thyratrons 4 and 5 control the reverse driving movement of motor 8. The forward and reverse control movement of reversible motor 8 is effected without the interposition of contactors or magnetically operated relays. The control is accomplished wholly electronically by an arrangement of bias control transformers which I have represented at 11, 12 and 13. Bias control transformer 11 is provided with a resistor transformer load represented at 22. Bias control transformer 12 is provided with a resistor transformer load 23.

The Thyratron tube 4 includes cathode 4a, control grid 4b and anode 4c. The input circuit to the Thyratron tube 4 is completed from cathode 4a through the secondary winding of transformer 11 shunted by loading resistor 22 through phase shift capacitor 29 and grid resistor 24 to control grid 4b. The input circuit to Thyratron tube 5 is completed from cathode 5a through the secondary winding of transformer 12 shunted by loading resistor 23 through phase shift capacitor 30 and resistor 31 to control grid 5b. The plate circuit of Thyratron 4 is connected in coacting relation to the cathode circuits of each of the Thyratrons 5, 6 and 7.

The input circuits to the Thyratron tubes 6 and 7 each include grid resistors shown at 25 and 26, grid resistor 26 being arranged in the input circuit to Thyratron tube 6 including control grid 6b, the alternating current source from transformer 13 and the cathode 6a. The input circuit to Thyratron tube 7 includes control grid 7b, grid resistor 25, and the drop across the plate load resistor 20 in the output circuit of amplifier 3 returning to ground and to cathode 7a.

The transformer 13 which controls the bias potential on Thyratron tube 6 has the primary winding thereof connected to the power supply source 34 and the secondary winding thereof shunted by phase shift capacitor 32. One side of the power supply source 34 is connected to ground at 34a. The windings for the motor 8 are connected in split phase with the center portion thereof connected to the alternating current power supply at 34; section 8b thereof connected to the clockwise motor control Thyratrons 6 and 7; and section 8c thereof connected to the counter-clockwise motor control Thyratron tubes 4 and 5 as shown. The split phase capacitor C1 connects across the split phase windings 8b and 8c as is conventional in a split phase three-lead reversible alternating current motor. When current is passing through Thyratrons 4 and 5, the current passes through winding 8c and through capacitor C1 and through winding 8b back to the other side of the alternating current supply at 34. Capacitor C1 operates as a phase shifting device such that when current travels through winding 8c to the opposite side of the line at 34 and through the winding 8b by reason of the path through capacitor C1 back to the other side of the line at 34 the magnetic field produced by winding 8b will lag the magnetic field produced by winding 8c. This difference in phase establishes a rotating field in the motor windings 8b and 8c, operating the motor in a counterclockwise direction. However, when Thyratrons 6 and 7 are conducting, motor 8 runs in the reverse direction because the current travels directly through winding 8b and thence through condenser C1 and through winding 8c, returning to the other side of the power supply source at 34. This split phase operation produces a magnetic field around windings 8b, 90° behind the magnetic field of winding 8c. This causes a rotating field in the opposite direction for operating the motor 8 clockwise. That is to say, condenser C1 causes a difference in phase in windings 8b and 8c dependent upon which set of Thyratrons 4—5 or 6—7 are conducting. The difference in phase between windings 8b and 8c determines the direction in which motor 8 will revolve.

Thyratron tube 7 serves as a leader and controls the reverse tubes 6—7 and 4—5. It will be observed that Thyratron tubes 6—7 are in effect connected with anode 7c to cathode 6a and cathode 7a to anode 6c, that is back-to-back so as together to pass an alternating current to winding or section 8b of motor 8 in accordance with cyclic operation of the system. Correspondingly cathode 4a of Thyratron tube 4 is connected in effect with anode 5c of Thyratron tube 5 while cathode 5a is connected in effect with anode 4c of Thyratron tube 4, that is, back-to-back so as to cyclically pass an alternating current to section or winding 8c of motor 8. The connection through lead 36 to the alternating current source 34 to each of the Thyratron tubes 4, 5, 6 and 7 enables the Thyratron tubes to coact in sets 4—5 and 6—7 to pass alternating current to either motor winding 8c or motor winding 8b. One of the Thyratron tubes 7 is used as the leader and it controls the reverse tubes 4—5, which in turn control the remaining Thyratron tube 6 and cause it to always be in exactly the same state of conduction as the leader tube 7 while they themselves (4—5) are always in the opposite state. This is accomplished by having the two reactors constituted by transformers 11—12 in the line through the control tube 7. The reactance of transformer 13 is in series with tubes 4 and 5 and between them and the winding 8c of the motor. Thus, when the tubes conduct, a bias is applied to tube 6 to prevent conduction. Tubes 7 and 6 apply a bias by means of the reactance of transformers 11 and 12. So long as tubes 4 and 5 do not conduct, tube 6 will conduct and thus the bias on tubes 4 and 5 is maintained through the cycle. When the control tube 7 conducts each of the reactances of transformers 11—12 applies a bias to one of the reverse tubes 4—5 and keeps them extinguished. When the control tube 7 is extinguished, the bias is removed and the reverse tubes 4—5 conduct. They in turn control the remaining Thyratron tube 6 in exactly the same manner, so in effect positive control is accomplished by the application of the signal from photoelectric tube 2 to one tube. A voltage swing of several volts will cause a change in rotation of the motor 8. As the signal from the amplifier 3 varies from 0 volt with light off to approximately 60–80 volts with light passing, positive control is effected.

The application of the circuit described in Fig. 1 to a mercury-in-glass barometer is schematically illustrated in Fig. 2. The purpose of the instrument is to indicate instantaneous atmospheric pressure accurate to three decimal places. The instrument consists of a conventional mercury-in-glass barometer schematically illustrated at 37 extending from a reservoir 38 to a position in which mercury column 39 is controlled by atmospheric pressure incident upon the mercury in the reservoir 38. The upper end of the barometer 37 extends adjacent a calibrated scale 40 and a light source 41 which is projected transversely across the scale and across the top of the mercury column 39 in the barometer 37. Associated with the barometer 37 there is a light confining aperture arrangement represented at 42 associated with a vertically adjustable housing 43 which houses the photoelectric tube 2. The vertically adjustable housing 43 is vertically movable on the precision screw jack represented schematically at 44 as driven through an apertured gear system schematically shown at 45. As the jack 44 is moved in a clockwise direction housing 43 is raised, whereas when jack 44 is rotated in a counter-clockwise direction housing 43 is lowered or vice versa in accordance with mechanical conditions of the particular problem which must be met.

It is understood that the light source 41, the calibrated scale 40 and the aperture arrangement 42 is associated with the housing 43 and photoelectric tube 2 therein so that the entire system designated as unit 58 raises and lowers as a unit dependent upon the position of the column of mercury 39 which is correspondingly determined by the conditions of barometric pressure. In other words the light source 41, aperture system 42 and photoelectric tube 2 in housing 43 operate as a scanning unit for scanning the top of the mercury column 39 at all levels thereof. The associated mechanism operates to maintain the photoelectric tube 2 always on the light beam level with the top of the mercury column 39. The photoelectric cell 2 is electrically connected with the amplifier shown at 3 in Fig. 2 corresponding to the same reference character of Fig. 1 and connected to the motor control unit embodying the Thyratron tubes 4, 5, 6 and 7 as heretofore explained and connected to the motor unit schematically shown in Fig. 2 at 8. Motor unit 8 drives apertured gear 46 which meshes with gear 45 and simultaneously drives gear 47 for revolving shaft 48 which turns bevel gear 49 associated with coacting bevel gear 50 which drives the odometer 51.

The instrument performs in the following manner. In a balanced condition the light ribbon from source 41 through aperture system 42 is approximately half eclipsed by the very uppermost portion of the crowned mercury surface of column 39. In this condition motor 8 does not rotate. If the mercury column 39 drops or rises by as much as .001, more or less light enters the photoelectric tube 2, the resulting signal is amplified by amplifier 3 and causes the motor 8 to rotate in the proper direction to move the light source 41 and photoelectric tube 2 to a position whereby the half eclipsed light condition is maintained. The vertical motion of the follower assembly 41—42—43—44 originates in the screw jack 44 driven by the motor 8. Its rotational position is a measure of changes in atmospheric pressure and is transmitted through proper gearing to the odometer 51 for ready observation.

In lieu of the circuit diagram illustrated in Fig. 1 I may employ the modified form of connection illustrated in Fig. 3. Corresponding parts have been indicated by similar reference characters as set forth in Fig. 1. In the modified arrangement, however, it will be observed that transformer 12 is now associated with the output of Thyratron tube 7 in circuit with the input circuit of Thyratron tube 4 and that an additional bias control transformer 52 has been arranged in the plate circuit of leader tube 7 with the secondary winding thereof associated with the input circuit of Thyratron tube 6. The transformer 52 is provided with a shunt connected phase shift condenser 53 which connects across the input circuit of Thyratron tube 6. In order to further improve the precision control of the circuits I introduce a shunt connected resistor 54 across the input circuit of Thyratron tube 4; a shunt connected resistor 55 across the input circuit of Thyratron tube 5 and a shunt connected resistor 56 across the input circuit of tube 6. I also introduce a further grid resistor 57 in circuit between the photoelectric tube 2 and the amplifier 3 as shown.

The revised circuit operates with improved accuracy with respect to the circuit of Fig. 1, although the principle of operation remains the same as that of the circuit of Fig. 1. The coupling of the output of one of the forward motor drive Thyratron tube control circuits, that is tube 7, with the input of one of the reverse motor control Thyratron tubes 4 through the reactance of transformer 12 more effectively controls the extinguishing and igniting properties of the Thyratron tube circuits. Similarly the coupling of the output circuit of the leader tube 7 through transformer 52 with the input circuit of the forward motor control Thyratron tube 6 enables these tubes to more effectively operate as a coacting unit.

The operation of the control circuit is as follows: The signal from the photo-tube amplifier is applied to forward tube 7, and its state of conductance controls forward tube 6 and reverse tubes 4 and 5. This control is achieved in the following manner: The forward tube 7 is paralleled by a voltage divider 59 including resistors 58 and 60. Between tap 64 on this voltage divider 59 and the end thereof is connected a half-wave rectifier 61 which connects through resistor 62 to the input circuit of tube 6, thus giving the controlling bias for forward tube 6. Condenser 63 connects across rectifier 61 through resistor 58. When forward tube 7 conducts, there is no appreciable voltage drop across voltage divider 59; and, hence, no bias on forward tube 6—and they will both conduct, driving the motor forward. When forward tube 7 does not conduct, line voltage appears across the voltage divider 59, tube 6 is biased, and so will not conduct, and thus will at all times follow tube 7.

Now, to control the reverse tubes 4 and 5, a reactor 12 is placed in the line from forward tube 7 to the forward winding of the motor. The output of the secondary winding of this reactor transformer 12 is fed to a full-wave rectifier 65, the return circuit being completed to tap 66 on loading resistor 23, which gives a control bias for reverse tube 5. This bias only appears when forward tube 7 conducts and thus holds reverse tube 5 in the opposite state of conductance as forward tube 7. Reverse tube 4 is caused to follow reverse tube 5 in exactly the same manner as forward tube 6 is caused to follow forward tube 7. So, taken as a unit, the motor control circuit functions to pass alternating current to either the forward winding or to the reverse winding of the motor, depending upon the magnitude of the signal from the amplifier.

The circuit arrangements of my invention are applicable to many types of remote control systems. The application to mercury-in-glass barometers is but one of the desirable applications of my invention. Accordingly I desire that it be understood that the circuits of my invention are applicable in all instances where a variable reading at one location is to be transmitted and translated at a remote location by electronic means operating wholly without electrical contactors or magnetically actuated relays.

While I have described my invention in certain of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. An electrical control system comprising a rotary motor having control windings excitable in either direction for controlling the operation of the motor either in a clockwise or counter-clockwise direction, pairs of coacting Thyratron tubes, each Thyratron tube including a cathode, a control grid, and an anode, circuits interconnecting the electrodes of each pair of Thyratrons including a connection from the anode of the Thyratron of one of said pairs of Thyratrons to the cathode of the coacting Thyratron in said pair of Thyratrons, means interconnecting said motor windings with said aforementioned connections, means for determining the polarity of control potential applied to the control grids of said Thyratrons for predetermining the operation of each pair of Thyratrons and controlling the direction of current supply to said motor control windings for correspondingly controlling the direction of rotation of the motor, reactance transformers, individual circuits connecting the control grids and cathodes of the coacting Thyratrons of one of said pairs of Thyratrons, said transformers including coupled primary and secondary windings with said primary windings connected in series and disposed between the anode of one of the Thyratrons of one pair and the anode of one of the Thyratrons of the other pair of Thyratrons and with said secondary windings individually connected with the individual circuits leading to the control grids and cathodes of the Thyratrons of one of said coacting pairs of Thyratrons.

2. An electrical control system comprising a rotary motor having control windings excitable in either direction for controlling the operation of the motor either in a clockwise or counter-clockwise direction, pairs of coacting Thyratron tubes, each Thyratron tube including a cathode, a control grid, and an anode, circuits interconnecting the electrodes of each pair of Thyratrons including a connection from the anode of the Thyratron of one of said pairs of Thyratrons to the cathode of the coacting Thyratron in said pair of Thyratrons, means interconnecting said motor windings with said aforementioned connections, means for determining the polarity of control potential applied to the control grids of said Thyratrons for predetermining the operation of each pair of Thyratrons and controlling the direction of current supply to said motor control windings for correspondingly controlling the direction of rotation of the motor and transformer reactors including coupled primary and secondary windings, with the secondary windings connected with the grid circuits of the Thyratrons of one pair of coacting Thyratrons and the secondary windings connected between the anode circuits of one of said last mentioned Thyratrons and the anode circuit of one of the Thyratrons of said other pair of coacting Thyratrons for sequentially controlling the operation of said pairs of Thyratrons.

3. In an electrical control system, a reversible motor unit including control windings excitable in either direction, a pair of groups of coacting Thyratrons, each group of Thyratrons including two coacting Thyratron tubes each having a cathode, control grid, and anode, a connection between the cathode of one Thyratron and the anode of the coacting Thyratron in each group of Thyratrons, means interconnecting said last mentioned connections and said motor windings, means for predetermining the potential applied to the control grids of said Thyratrons for predetermining the direction of current supply to said control windings for correspondingly controlling the direction of rotation of said motor, reactor transformer circuits individual to the grid and cathode circuits of one pair of said groups of coacting Thyratrons, each of said reactor transformer circuits including coupled primary and secondary windings, with said secondary windings shunt connected by resistors and a condenser disposed in each of the individual circuits leading to the said grid electrodes, and a series circuit interconnecting said primary windings, one end of said series circuit being connected with the anode of a Thyratron in one of the pairs of groups of coacting Thyratrons and the other end of said series circuit being connected with the anode of a Thyratron in the other of said coacting pair of Thyratrons.

4. In an electrical control system, a reversible motor unit including control windings excitable in either direction, a pair of groups of Thyratrons, each group of Thyratrons including two coacting Thyratron tubes each having a cathode, control grid, and anode, a connection between the cathode of one Thyratron and the anode of the coacting Thyratron in each group of Thyratrons, means interconnecting said last mentioned connections and said motor windings, means for predetermining the potential applied to the control grids of said Thyratrons for predetermining the direction of current supply to said control windings for correspondingly controlling the direction of rotation of said motor, and reactor transformers having primary windings electrically connecting the anode of one Thyratron in one pair of Thyratrons and the anode of one Thyratron in the other pair of Thyratrons, and secondary windings individual to said primary windings, and means separately connecting said secondary windings individually to the grids and cathodes of the Thyratrons constituting one of said pair of coacting Thyratrons.

References Cited in the file of this patent

UNITED STATES PATENTS

| | | |
|---|---|---|
| 2,150,265 | Conover | Mar. 14, 1939 |
| 2,175,009 | Anderson | Oct. 3, 1939 |
| 2,259,958 | Levy | Oct. 21, 1941 |
| 2,333,393 | Ryder | Nov. 2, 1943 |
| 2,497,053 | Wills | Feb. 7, 1950 |
| 2,555,674 | Carrick | June 5, 1951 |